United States Patent
Ash et al.

(10) Patent No.: US 6,590,867 B1
(45) Date of Patent: Jul. 8, 2003

(54) INTERNET PROTOCOL (IP) CLASS-OF-SERVICE ROUTING TECHNIQUE

(75) Inventors: Gerald Richard Ash, West Long Branch, NJ (US); Jiayu Chen, Morganville, NJ (US); Saul Daniel Fishman, Edison, NJ (US); Anurag S. Maunder, Scotch Plains, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/321,027

(22) Filed: May 27, 1999

(51) Int. Cl.$^7$ .................................................. H04J 1/16
(52) U.S. Cl. .................. 370/236; 370/252; 370/389; 709/240
(58) Field of Search .......................... 370/395.2, 395.5, 370/395.51, 328, 351, 236, 230, 410, 401, 238.1, 233, 396, 386, 238, 239, 353, 342, 352, 400, 355, 469, 389, 348, 229, 254–258; 709/227, 241, 236, 242, 247, 240, 238, 228; 705/30; 707/4

(56) References Cited

U.S. PATENT DOCUMENTS

| | | | |
|---|---|---|---|
| 5,101,348 A | * 3/1992 | Arrowood et al. | 709/242 |
| 5,130,982 A | 7/1992 | Ash et al. | 370/352 |
| 5,392,344 A | 2/1995 | Ash et al. | 379/221.07 |
| 5,559,877 A | 9/1996 | Ash et al. | 379/221.05 |
| 5,825,772 A | * 10/1998 | Dobbins et al. | 370/396 |
| 5,838,663 A | * 11/1998 | Elwalid et al. | 370/233 |
| 5,940,372 A | * 8/1999 | Bertin et al. | 370/328 |
| 5,995,503 A | * 11/1999 | Crawley et al. | 370/351 |
| 6,016,319 A | * 1/2000 | Kshirsagar et al. | 370/410 |
| 6,041,039 A | * 3/2000 | Kilkki et al. | 370/230 |
| 6,094,687 A | * 7/2000 | Drake, Jr. et al. | 709/241 |
| 6,134,589 A | * 10/2000 | Hultgren | 709/227 |
| 6,141,325 A | * 10/2000 | Gerstel | 370/328 |

OTHER PUBLICATIONS

Cisco Tech Notes, "OSPF Design Guide—Section 1", www.cisco.com, 15 pages.*

Newton's Telecom Dictionary, OSPF definition, Oct. 1998, p. 54.*

University of Virginia, ATM Tutorial, 2002, p. 16.*

Crawley et al., "RFC 2386: A Framework for QoS–based Routing in the *Internet IETF, 'Online!'*" Aug. 1998, pp. 1–37, XP002219363, Internet—Retrieved from the Internet: <URL: ftp//isi.edu/in–notes/rfc2386.txt> retrieved on Oct. 31, 2002!.

Deepak Sreekantan, "Implementation of a Bandwidth Broker System for Resource Management in Differentiated Services", University of Kansas *CD–ROM*! May 16, 1999, p. 1, XP002219364, Lawrence, KS 66045–2228, Retrieved from the internet: <URL:http://ftp.www.ittc.ukans.edu/{kdrao/845/intro.html, retrieved on Oct. 31, 2002!, *p. 3, line 8–line 16*.

Jamin, S., et al., "A Measurement–Based Admission Control Algorithm for Integrated Service Packet Networks" *IEEE/ACM Transactions on Networking*, IEEE Inc., New York, US, vol. 5, No. 1, Feb. 1, 1997), pp. 56–69, XP000678916, ISSN: 1063–6692.

European Search Report dated Nov. 13, 2002 regarding European Patent Application No. 00302451.0.

* cited by examiner

*Primary Examiner*—Hassan Kizou
*Assistant Examiner*—John Pezzlo

(57) ABSTRACT

The priority of the flow of packets representing calls or other connection requests within a packet network (10) is determined from the Class-of-Service of the call. Upon receipt of a call, a recipient router ($12_1$, $12_2$, $12_3$) identifies available paths, typically by exchanging messages with the other routers in the network. After selecting the path, the recipient router or centralized bandwidth broker determines whether the links comprising the selected path have available bandwidth for the class of service of the call. If so, the router routes the call to the next hop along the path. Otherwise, the router selects another path(s) and checks whether the links on the path possess sufficient bandwidth for the class of service of the call.

7 Claims, 1 Drawing Sheet

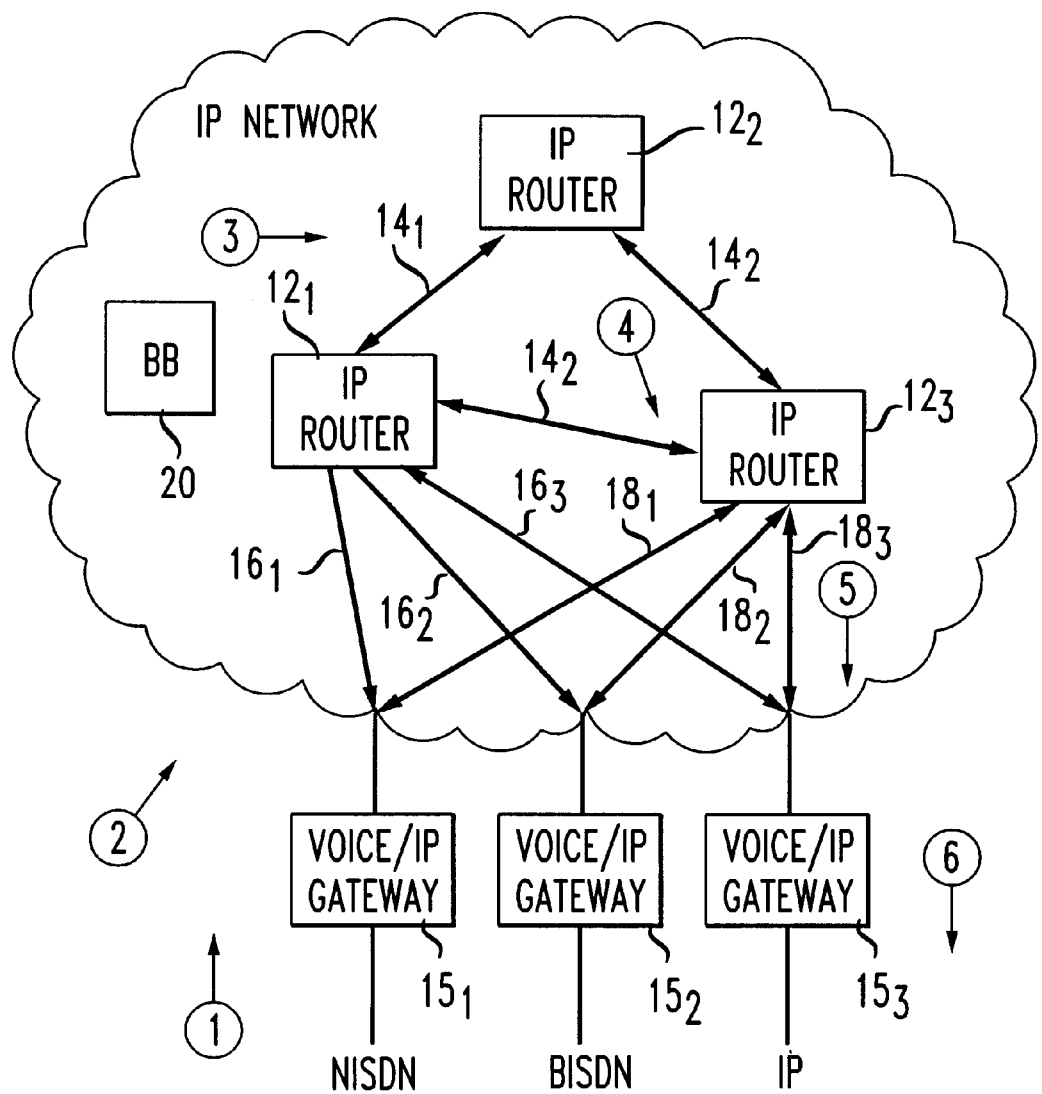

INTERNET PROTOCOL (IP) CLASS-OF-SERVICE ROUTING TECHNIQUE

TECHNICAL FIELD

This invention relates to technique for routing calls and other types of connection requests in an IP network.

BACKGROUND ART

Traditional telecommunications networks typically use dedicated circuits to carry telephone traffic between facilities. Within such traditional networks, switching systems, such as the 4ESS switching systems used by AT&T, route calls by setting up a circuit that lasts the entire duration of the call and then tearing down the circuit thereafter. For this reason, such traditional networks are commonly referred to as "circuit-switched" networks.

Increases in traffic and capacity constraints on existing switches within such circuit-switched networks has prompted the development of packet-based networks, and in particular, Internet-Protocol (IP) networks. A typical IP network employs a plurality of routers, such as those manufactured by Cisco, Ascend Communications, Bay Networks and Newbridge, among others, to route data packets representing a call or other connection independently from an origin to a destination based on a destination address in each packet. Present day IP networks of the type described above are characterized by best effort routing. In other words, routing, and particularly, path selection occurs generally without regard to criterion such as class of service. Today, examples of the most prevalent routing techniques in IP networks are the Open Shortest Path First (OSPF) protocol and Border Gateway Protocol (BGP). In the OSPF protocol, for example, routers within the network exchange information with each other by a flooding technique so that each maintains a database of the network topology. Using the information in its stored database, each router selects a path for each packet in accordance with user-established cost metrics that typically require the shortest possible path. Using such cost metrics, each router establishes its routing table accordingly so each router can select a path having, for example, a minimum number of links.

Traditionally, providers of telecommunications services have offered different grades or classes of service based on customer demand. To meet quality objectives for such different grades of service, telecommunications providers, such as AT&T, have employed Class-of-Service routing techniques in traditional circuit switched networks. U.S. Pat. No. 5,392,344, issued in the name of Gerald R. Ash et al., on Feb. 21, 1995, and assigned to AT&T (incorporated by reference herein) describes and claims such a Class-of-Service routing technique. Unfortunately, Class-of-Service routing does not exist with present day IP telecommunications networks. Thus, there is a need for an Internet Protocol (IP) Class-Of-Service routing technique.

BRIEF SUMMARY OF THE INVENTION

Briefly, the present invention provides a technique for routing a call or other connection request between an origin and destination in an IP network comprised of routers connected by links that carry data packets between routers. In accordance with the invention, the routers exchange status messages to identify available paths between the origin and destination. Each path includes at least one outgoing link from one router to another. First the class of service of the call or other connection request is determined. Then a path is selected that has a minimum cost, such as for example a minimum number of hops. Thereafter, a check is made by the originating router or possibly a centralized bandwidth broker, based on flooded network status information, of the selected path as to whether the links from that router forming the path have an available depth (i.e., bandwidth capacity not reserved for other services) for the determined class of service. If the links possess the requisite bandwidth, the router routes the packet over the outgoing link. Otherwise, another path is selected and the step of determining if the links forming the path have the requisite depth is repeated. After an allowed path is found, the IP packets are treated according to their class-of-service designated priority in the queuing discipline used by the routers in the path.

BRIEF SUMMARY OF THE DRAWING

FIG. 1 depicts a block schematic diagram for practicing the IP Class-of Service routing technique of the invention.

DETAILED DESCRIPTION

FIG. 1 shows a simplified block schematic diagram of an IP network 10 comprised of a plurality of routers, exemplified by routers $12_1$, $12_2$ and $12_3$. Links $14_1$ $14_2$, and $14_3$ connect router pairs $12_1$–$12_2$, $12_2$–$12_3$, and $12_1$–$12_3$, respectively allowing the routers to pass data packets, representing telephone calls, or other information among themselves. Although the illustrated embodiment of network 10 includes only the three routers $12_1$–$12_3$ and three pairs of connecting links, the network may include a far larger number of routers and interconnecting links.

Voice traffic destined for transit through the network 10 enters and exits the network via at least one, and preferably, a plurality of voice/IP gateways, exemplified by voice/IP gateways $15_1$, $15_2$, and $15_3$. In the illustrated embodiment, the voice/IP gateway $15_1$ handles Narrowband Integrated Services Digital Network (NISDN) traffic, e.g., traffic transmitted in 64 kilobit per second blocks. The voice/IP gateway $15_2$ handles Broadband Integrated Services Digital Network (BISDN) traffic, e.g., traffic that exceeds 144 kilobits per second, the basic transmission rate for NISDN traffic. Such BISDN traffic may include voice, video and image data, for example. The voice/IP gateway $15_3$ handles data already in an IP format. Depending on the nature of the traffic, the network 10 may include other Voice/IP gateways (not shown) each designed for a particular format.

Traditionally, the routers $12_1$, $12_2$, and $12_3$ have utilized a best effort routing policy to route traffic within the network 10, using such algorithms as the Open Shortest Path First (OSPF) algorithm that seeks to route each packet on the shortest possible path. Presently, the OSPF routing protocol could theoretically support different Types of Service (TOS) based on the following criteria: Delay, Throughput and Reliability. However, IP networks, such as network 10, which utilize OSPF routing have not offered Class of Service (COS) that has been available in circuit-switched networks, making it difficult for telecommunications carriers to offer different classes of service using an IP network.

The present invention affords a technique for accomplishing COS routing in an IP network. Upon determination of the class of service, which includes the priority and other parameters of the call or other connection at its initial set-up, an originating router that receives packets from one of the gateways $15_1$, $15_2$ and $15_3$ selects a route based on the requisite depth (required bandwidth), which in turn is based on the flow priority and load state of the links ($14_1$, $14_2$, $14_3$) in network 10. Once the originating router selects an admissible path, each subsequent router performs routing of the packets according to the determined path and priority, as now described further.

To determine requisite depth, the originating router in network 10 determines the equivalent bandwidth needed for the call or other connection and also utilizes a Bandwidth in Progress (BWIP) indication for the determined class of service at the start of the call or other connection. To that end, two quantities: Bandwidth Peg Count (BWPC) and a Bandwidth Overflow Count (BWOV) are kept for each link connecting an originating/terminating router pair. During a given interval of X minutes, each router, such as router $12_1$ tracks for each link to another router the following quantities:

BWPC(link)=Sum of all Bandwidth (BW) required for flows on the link; and

BWOV(link)=Sum of BW required for each blocked flow on the link

In the class of service routing method, various virtual networks are maintained which are allocated bandwidth according to demands. Each router also maintains the following two Depth parameters for each virtual network:

$BWavg_{vk}$, the Bandwidth required for each Virtual Network$_v$ ($VN_v$) and node-pair k to carry the average Bandwidth-In-Progress ($BWIP_{vk}$) [=Erlang $Load_{vk} \times$ (Avg bandwidth per virtual connection)$_{vk}$] and $BWmax_{vk}$, the Bandwidth required to meet the blocking probability Grade-of-Service objective=[TREBS (Erlang $Load_{vk}$, Grade-of-Service)$\times$(Avg bandwidth per virtual connection)$_{vk}$]

where TREBS represents the well known Erlang-B formula for trunk requirements.

In practice, $BWavg_{vk}$ and $BWmax_{vk}$ are computed at prescribed intervals, typically weekly. Different values of $BWavg_{vk}$ and $BWmax_{vk}$ may be used for different periods of the day (business peak, residence peak).

Four different blocking reservation thresholds (BR1, BR2, BR3, BR4) are used, where $0\% \leq BR1 \leq BR2 \leq BR3 \leq BR4 \leq 100\%$. The reservation level N is 0 if the link blocking (NN) does not exceed BR1, N=1 if NN exceeds BR1 but not BR2, N=2 if NN exceeds BR2 but not BR3, N=3 if NN exceeds BR3 but not BR4, and N=4 if NN exceeds BR4. This relationship is depicted in Table I.

TABLE I

Determination of Reservation Level (N)

| N | Condition |
|---|---|
| 0 | NN (link blocking) $\leq$ BR1 |
| 1 | BR1 < NN $\leq$ BR2 |
| 2 | BR2 < NN $\leq$ BR3 |
| 3 | BR3 < NN $\leq$ BR4 |
| 4 | BR4 < NN |

The Idle Link bandwidth (ILBW) for each link is used in the determination of the link Load State. In addition to the Load State of each local link (i.e., the link associated with a particular router), the Load State of all other network links is received from other routers using, for example, an extension of the currently used OSPF flooding mechanism. A metric such as "throughput or bandwidth available" might theoretically be supported by the OSPF routing algorithm to provide an indication of the Load State of all links in the network 10. Also, another metric such as "delay" may provide an indication of the Load State. In addition to being flooded to every other router in the network, this link metric information on bandwidth available, delay, or other measures could be flooded to a centralized bandwidth broker (BB), 20 which could track the link status information and perform routing computations, as discussed further below.

A link extending between a router pair is considered in a reserved (R) state if the Idle Bandwidth (ILBW) is less than or equal to a Reserved Threshold (Rthr), as defined below. The link is considered in the Heavily Loaded (HL) state if the Idle Bandwidth is less than or equal to a Heavily Loaded threshold (HLthr) for the link but more than Rthr. Conversely, the link is considered Lightly Loaded (LL) if the Idle Bandwidth for each link in the path is greater than HLthr for the link. This relationship is best depicted in Table II (hereafter we have omitted, for simplicity, the subscripts k denoting the node-pair for each variable):

TABLE II

Load State Condition

| Name of State | Condition |
|---|---|
| Busy B | ILBW = 0 |
| Reserved R | ILBW $\leq$ Rthr |
| Heavily Loaded HL | Rthr < ILBW $\leq$ HLthr |
| Lightly Loaded LL | HLthr < ILBW |

The Reservation Threshold Rthr and Heavily Loaded Threshold HLthr are given by the relationships Rthr=N$\times$0.05$\times BWmax_v$ HLthr=Rthr+0.05$\times BWmax_v$ where N is the reservation level based on the Blocking Reservation thresholds (BR1, BR2, BR3, and BR4).

The Depth-of-Search (DoS) for a flow to use various Load States depends on the Bandwidth-In-Progress ($BWIP_v$), the $BWavg_v$ and $BWmax_v$ thresholds, the priority of the call or other connection, and whether the path is the first choice path or alternate path, as illustrated in Table III (here again we have omitted, for simplicity, the subscripts k denoting the node-pair for each variable):

TABLE III

DoS CRITERION

| Load State Allowed$_v$ | Key Service | Normal Service | | |
|---|---|---|---|---|
| | | First Choice Path | Alternate Path | Best Effort Service |
| R | if $BWIP_v \leq 2 \times BWmax_v$ | if $BWIP_v \leq BWavg_v$ | Not Allowed | Not Allowed |
| HL | if $BWIP_v \leq 2 \times BWmax_v$ | if $BWIP_v \leq BWmax_v$ | if $BWIP_v \leq BWavg_v$ | Not Allowed |
| LL | All $BWIP_v$ | All BWIPv | All $BWIP_v$ | All $BWIP_v$ |

The originating router determines the allowed DoS for the call or other connection according to Table III. The originating router first attempts to route the call on shortest path to the terminating router.

For a key service flow:

If $BWIP_v \leq 2 \times BWmax_v$, then all load states are allowed.

If $BWIP_v > 2 \times BWmax_v$, then only LL links are allowed.

For a normal service flow:

If $BWIP_v > BWavg_v$, then all load states are allowed on the first choice path and the HL and LL states are allowed on alternate paths If $BWavg_v < BWIP_v \leq BWmax_v$, then only HL and LL states are allowed on the first choice path and LL state is allowed on alternate paths If $BWIP_v > BWmax_v$, then only the LL links are allowed are on first choice and alternate paths For a best effort service call only LL links are allowed.

The originating router first determines the class of service of the call (or other connection request) from information associated with the call. In routing calls in accordance with the invention, an originating router, (e.g., router $12_1$) will determine the. Load State of the network links. As discussed previously, the Load State information for all links in the network 10 could be distributed, for example, via the OSPF flooding protocol. The originating router selects a path having, for example, a minimum number of hops using the shortest path routing algorithm. Using the depth parameters discussed above, the originating router then checks whether the links forming the selected path have an available depth (bandwidth capacity) for the determined class of service. If so, the router routes the packets of the call or connection request over the links in the selected path. Otherwise, another path is selected and the step of determining if the links in the path have available capacity and depth is repeated. If the originating router cannot route the call or other connection to the selected destination router, and there are other terminating routers that can route the call, then the originating router uses the shortest path algorithm to select candidate paths and the class of service routing technique to route the call to such a terminating router. If there is no available terminating router, the call is blocked.

As was discussed earlier, the centralized bandwidth broker (BB) 20 could receive the link status metric information through the flooding mechanism, and perform the same routing computations described above for the originating router. That is, in response to a request from an originating router, for example, the BB 20 could select a path having a minimum number of hops using the shortest path routing algorithm, depth parameters, and available link bandwidth. Once an admissible path is found, the path information is returned to the originating router which can then route the packets in the flow accordingly.

After the path is established by the originating router and packets are flowed on the path, at each hop the recipient router performs priority packet queuing based on the routing priority assigned by the originating router to each packet, such as contained in the TOS field indicator of the packet. The TOS indicators in each packet are set so that the recipient router at each subsequent hop uses the same queuing priority as determined by the originating router for the selected shortest path and COS routing treatment. Hence the COS capability afforded by the method of the invention may be enhanced by adding a priority queuing capability. At each link, the router maintains a queuing discipline such that packets having a higher TOS requirement (TOS and precedence bits) have priority over lower TOS requirements, such as best effort service.

The foregoing describes a technique for achieving Class-of-Service routing in an IP network.

The above-described embodiments merely illustrate the principles of the invention. Those skilled in the art may make various modifications and changes that will embody the principles of the invention and fall within the spirit and scope thereof.

What is claimed is:

1. A method for routing a connection between an origin and destination in an Internet Protocol (IP) network comprised of a plurality of routers connected by links that carry packets between the routers, comprising the steps of:

(a) exchanging status messages within the network to identify a group of available paths each running between the origin and destination, each path including at least one link;

(b) selecting among the group of available paths a first path for routing the connection;

(c) determining a class of service for the connection;

(d) checking the selected path to determine whether each link forming the selected path has an available bandwidth for the class of service of the connection, and if so, routing the data packets representative of the call over said outgoing link; otherwise;

(e) selecting another path; and (f) repeating step (d) and repeating step (e) in the event said another path has a link lacking available bandwidth, wherein the step of checking whether the link has an available bandwidth includes the steps of:

measuring actual bandwidth on said link:

determining link blocking in accordance with the actual bandwidth;

establishing reservation thresholds in accordance with the link blocking;

determining the load state of the links in a path in accordance with the bandwidth reservation thresholds; and establishing the availability of the path in accordance with the class of service of the connection request, the load state of the links in the path, and a required bandwidth for each virtual network associated with the class of service for the connection.

2. The method according to claim 1, wherein the required bandwidth for the class of service is established periodically.

3. A method for routing a connection between an origin and destination in an Internet Protocol (IP) network comprised of a plurality of routers connected by links that carry packets between the routers, comprising the steps of:

(a) exchanging status messages within the network to identify a group of available paths each running between the origin and destination, each path including at least one link, wherein each link may have one of reserved, lightly loaded, or heavily loaded load states;

(b) selecting among the group of available paths a first path for routing the connection;

(c) determining a class of service for the connection, wherein the classes of service include key service, normal service and best effort service;

(d) checking the selected path to determine whether each link forming the selected path has an available bandwidth for the class of service of the connection, and if so, routing the data packets representative of the call over said outgoing link; otherwise;

(e) selecting another path; and (f) repeating step (d) and repeating step (e) in the event said another path has a link lacking available bandwidth, wherein for key service, all load states are allowed if actual bandwidth in progress $(BWIP_v) \leq 2 \times Bwmax_v$, where $BWavg_{vk}$, the Bandwidth required for each Virtual Network$_v$ (VN$_v$) and node-pair k to carry the average Bandwidth-In-Progress (BWIP$_{vk}$) [=Erland Load$_{vk}$× (Avg bandwidth per virtual connection)$_{vk}$] and $BWmax_{vk}$, the Bandwidth required to meet a blocking probability Grade-of-Service objective=[TREBS (Erlang Load$_{vk}$, Grade-of-Service)×(Avg bandwidth per virtual connection)$_{vk}$].

4. The method according to claim 3, wherein for key service, only lightly loaded links are allowed if BWIP$_v$>2× BWmax$_v$.

5. A method for routing a connection between an origin and destination in an Internet Protocol (IP) network comprised of a plurality of routers connected by links that carry packets between the routers, comprising the steps of:

(a) exchanging status messages within the network to identity a group of available paths each running between the origin and destination, each path including at least one link;

(b) selecting among the group of available paths a first path for routing the connection;

(c) determining a class of service for the connection, wherein the classes of service include key service, normal service and best effort service;

(d) checking the selected path to determine whether each link forming the selected path has an available bandwidth for the class of service of the connection, and if so, routing the data packets representative of the call over said outgoing link; otherwise;

(e) selecting another path; and (f) repeating step (d) and repeating step (e) in the event said another path has a link lacking available bandwidth, wherein for normal service, all load states are allowed on the first choice path and heavily loaded and lightly loaded states are allowed on alternate paths, if actual bandwidth in progress (BWIP$_v$)≦BWavg$_v$, where BWavg$_{vk}$, the Bandwidth required for each Virtual Network$_v$ (VN$_v$) and node-pair k to carry the average Bandwidth-In-Progress (BWIP$_{vk}$) [=Erland Load$_{vk}$× (Avg bandwidth per virtual connection)$_{vk}$] and BWmax$_{vk}$, the Bandwidth required to meet a blocking probability Grade-of-Service objective=[TREBS (Erlang Load$_{vk}$, Grade-of-Service)×(Avg bandwidth per virtual connection)$_{vk}$].

6. The method according to claim 5, wherein for normal service calls, heavily loaded and lightly loaded states are allowed on the first choice path and only the lightly loaded load state is allowed on alternate paths, if BWavg$_{vk}$<BWIP$_v$≦BWmax$_{vk}$.

7. The method according to claim 5, wherein for normal service calls, only lightly loaded links are allowed on all paths when BWIP$_v$>BWmax$_{vk}$.

* * * * *